Patented Dec. 25, 1951

2,579,499

UNITED STATES PATENT OFFICE 2,579,499

SYNTHETIC OILS

Wesley A. Jordan and Harold Wittcoff, Minneapolis, Minn., assignors to General Mills, Inc., a corporation of Delaware No Drawing. Application October 27, 1949, Serial No. 123,976

5 Claims. (Cl. 260—410.6)

The present invention relates to a novel procedure for the clarification of synthetic oils, in the preparation of which lead compounds are used as catalysts.

In the preparation of synthetic oils by the esterification of polyhydric alcohols with fatty acids it has often been found desirable to employ as catalysts lead compounds such as lead oxide, lead stearate, or lead naphthenate. Esterification of fatty acids and polyhydric alcohols will proceed in the absence of a catalyst, but usually an excessive period of time is necessitated. Thus, for example, the esterification of 2,2,6,6-tetramethylolcyclohexanol with fatty acids in the absence of a catalyst requires as long as 16 hours at 235° C. in order to obtain an acid number below 10. This process of esterification, furthermore, requires considerable excess of the polyhydric alcohol. In contrast to this cumbersome procedure, as little as 0.25% of lead stearate employed as a catalyst will reduce the reaction time to 4 to 8 hours at 235° F. to obtain comparable acid numbers, and will at the same time obviate the need for large excesses of polyhydric alcohols.

While it is therefore desirable to employ the lead compounds as catalysts, it has been observed that the use of the catalysts involves a disadvantage in that the dissolved lead compounds precipitate when the synthetic oil is cooled to yield a cloudy composition which cannot be filtered without undue difficulty, even by employing conventional amounts of filter aid. The lead compounds are insoluble in the oil only at fairly low temperatures, such, for example, as room temperature at which point the oils possess such a high viscosity that filtration is difficult, if not impossible. At the more elevated temperatures at which the viscosity of the oil is reduced sufficiently to render them filtrable, the lead compounds appear to be soluble and provide a clear oil. It is apparent, therefore, that in order to effect separation of the cloudy material it is necessary to filter at the low temperatures where viscosities are excessive.

In some uses to which these synthetic oils are put, as for example, in paints, where a pigment is employed, the presence of the cloudiness is of no consequence. In other uses, however, clear oils are desired and for these purposes the removal of the cloudiness is a difficult task. By means of the present invention it is possible to clarify these oils in a direct and simple manner at very slight expense and without the employment of extra equipment.

It is therefore an object of the present invention to provide a novel process of clarifying synthetic oils for the removal of lead esterification catalysts.

The present invention involves the discovery that when a small quantity of phthalic anhydride is added to the clear heated oil at the end of esterification a precipitate appears in the hot oil, which precipitate can readily be removed by filtration at an elevated temperature. Obviously, at an elevated temperature the oil has a low viscosity which makes filtration a simple matter. The amount of phthalic anhydride needed to produce this result appears to vary with the concentration of the lead salt and, in general, it has been found that when from 0.5 to 20 moles of phathalic anhydride are used per mole of lead catalyst, clarification occurred as described. The precipitate forms in the hot oil and after filtration when the oil is allowed to cool, there is no further cloudy precipitate and the oil remains clear for an indefinite period of time.

The temperature employed for the phthalic anhydride treatment is subject to considerable variation. It is sufficient to heat the oil to a temperature at which the phthalic anhydride dissolves. At 50° C. this may take an extended period of time. At 200° C. it will occur in a matter of a few minutes. The solution of the phthalic anhydride occurs sufficiently rapidly that it is usually not necessary to use temperatures in excess of 100° C. It will be apparent, therefore, that any temperature which will effect solution of the phthalic anhydride is sufficient for this reaction. Usually it is preferred to employ a temperature somewhat near that at which the filtration is to be effected.

Example 1

A mixture of 46 pounds of soybean oil fatty acids, 9.04 pounds of 2,2,6,6-tetramethylolcyclohexanol, and 0.56 pound of lead stearate were heated over a period of two hours to 235° C. in a stainless steel kettle with agitation. Thereafter, vacuum was applied for 4 hours at 235° C. The resulting oil had an acid number of 5.6 and a viscosity of I. The oil, on cooling, was very cloudy.

To three samples, consisting of 100 parts of the above cloudy oil, heated on the steam bath, was added, respectively, .3%, .4% and .5% phthalic anhydride. On continued heating on the steam bath, the phthalic anhydride dissolved within each of the samples and a white precipitate appeared. To each of these samples was added a small amount of filter aid, whereupon the oils were filtered while hot. There resulted perfectly clear oils with acid numbers which varied from 5.6 to 6.4. The samples remained clear indefinitely, even at temperatures as low as 0° C.

Example 2

Cloudy 2,2,6,6-tetramethylolcyclohexanol - linseed acid esters containing 0.5 to 1.5% lead stearate as catalyst were divided into aliquots, and each portion was treated with a successively increasing portion of phthalic anhydride. Clarification occurred when 0.5-20 mols of phthalic anhydride were used per mole of lead stearate present. The clarification was accomplished by heating the cloudy oil on the steam bath to dissolve the precipitated catalyst. To this clear oil was added the phthalic anhydride which dissolved on heating and agitation. A precipitate resulted which could be readily filtered from the hot oil with the aid of filter aid. The following table shows the experiments carried out.

| Per Cent Lead Stearate in Oil | Moles of Phthalic Anhydride added per mole of lead stearate |
|---|---|
| 1.5 | 0.5 |
| 1.5 | 1.0 |
| 1.5 | 2.0 |
| 1.5 | 4.0 |
| 1.5 | 8.0 |
| 0.5 | 10.0 |
| 0.5 | 20.0 |

Example 3

Samples of a cloudy oil prepared from the unsaturated fatty acid fraction derived from soybean oil soap stock, esterified with pentaerythritol, were treated with 0.5, 1.0, 2.0 and 5.0 moles of phthalic anhydride per mol of lead stearate present as described in the previous examples. Clarification resulted in each instance.

Example 4

Aliquots of a cloudy oil derived from linseed oil acids and glycerol were treated with 0.5, 1.0, 2.0 and 5.0 moles of phthalic anhydride per mole of lead stearate present as described in the previous examples. Clarification resulted in each instance.

The invention is applicable to synthetic oils prepared from fatty acids, whether saturated or unsaturated, and polyhydric alcohols in general, in which lead compounds such as the oxides or lead salts are employed as catalysts. It will thus be seen that the present invention has provided a novel and simple method of eliminating the objectionable cloudiness encountered when advantage is taken of the use of a lead catalyst for esterification in the production of the synthetic oils.

While various modifications of the invention have been described, it is to be understood that others are possible without departing from the spirit thereof.

We claim as our invention:

1. Process of clarifying a synthetic oil derived by the esterification of a fatty acid with a polyhydric alcohol in the presence of a lead esterification catalyst, which comprises treating the oil with phthalic anhydride in a quantity of from one-half to twenty moles per mole of lead present in the oil, and removing the precipitate thus formed.

2. Process of clarifying a synthetic oil derived by the esterification of a fatty acid with a polyhydric alcohol in the presence of a lead esterification catalyst, which comprises adding phthalic anhydride to the oil, heating the oil to an elevated temperature to form a precipitate therein, and filtering the oil at the elevated temperature.

3. Process of clarifying a synthetic oil derived by the esterification of a fatty acid with glycerol in the presence of a lead esterification catalyst, which comprises treating the oil with phthalic anhydride in a quantity of from one-half to twenty moles per mole of lead present in the oil, and removing the precipitate thus formed.

4. Process of clarifying a synthetic oil derived by the esterification of a fatty acid with pentaerythritol in the presence of a lead esterification catalyst, which comprises treating the oil with phthalic anhydride in a quantity of from one-half to twenty moles per mole of lead present in the oil, and removing the precipitate thus formed.

5. Process of clarifying a synthetic oil derived by the esterification of a fatty acid with 2,2,6,6-tetramethylolcyclohexanol in the presence of a lead esterification catalyst, which comprises treating the oil with phthalic anhydride in a quantity of from one-half to twenty moles per mole of lead present in the oil, and removing the precipitate thus formed.

WESLEY A. JORDAN.
HAROLD WITTCOFF.

REFERENCES CITED

The following references are of record in the file of this patent:

UNITED STATES PATENTS

| Number | Name | Date |
|---|---|---|
| 2,343,433 | Wells | Mar. 7, 1944 |